US012608431B2

(12) United States Patent
Deshpande et al.

(10) Patent No.: US 12,608,431 B2
(45) Date of Patent: Apr. 21, 2026

(54) SYSTEMS AND METHODS FOR SERVING SHORT-FORM DATA REQUESTS RELATED TO USAGE OF CLOUD COMPUTING RESOURCES

(71) Applicant: Capital One Services, LLC, McLean, VA (US)

(72) Inventors: Vivin Deshpande, Virginia Beach, VA (US); Rohit Sharma, Sterling, VA (US); Ashish Kumar Roy, Richmond, VA (US); Nicholas Zolnoor, Fairfax, VA (US); Gurjeet Chinayna, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 316 days.

(21) Appl. No.: 18/188,411

(22) Filed: Mar. 22, 2023

(65) Prior Publication Data

US 2024/0320279 A1     Sep. 26, 2024

(51) Int. Cl.
*G06F 16/9535*     (2019.01)
*G06F 21/62*     (2013.01)

(52) U.S. Cl.
CPC ...... *G06F 16/9535* (2019.01); *G06F 21/6227* (2013.01)

(58) Field of Classification Search
CPC .......................... G06F 16/9535; G06F 21/6227
See application file for complete search history.

(56) References Cited

U.S. PATENT DOCUMENTS

| | | | | |
|---|---|---|---|---|
| 8,683,560 | B1 * | 3/2014 | Brooker .................. | H04L 63/20 |
| | | | | 713/168 |
| 10,693,804 | B1 * | 6/2020 | Gladney ................ | H04L 47/828 |
| 11,269,871 | B1 * | 3/2022 | Bigdelu ................ | G06F 16/252 |
| 2017/0180373 | A1 * | 6/2017 | Shao .................... | H04L 63/0876 |
| 2021/0014221 | A1 * | 1/2021 | Kukreja ................ | H04L 63/108 |
| 2021/0258308 | A1 * | 8/2021 | Avetisov .............. | H04L 9/0825 |
| 2022/0086165 | A1 * | 3/2022 | Dasari .................. | H04L 63/101 |

* cited by examiner

*Primary Examiner* — Emmanuel L Moise
*Assistant Examiner* — Xiang Yu
(74) *Attorney, Agent, or Firm* — Foley & Lardner LLP

(57) ABSTRACT

The systems and methods disclosed herein allow the cloud services to better apportion cloud resources between multiple cloud services recipients. The systems and methods accomplish this by both accessing the relevant data (e.g., despite existing security and/or access restrictions) as well as providing it in a short-form communication (e.g., in a format that is usable). The systems and methods accomplish this by first determining a dataset for generating a response to a query and then determining a portion of the dataset that is available to the user.

20 Claims, 5 Drawing Sheets

200

204

ML Model 202

206

<u>300</u>

400

Receive a first short-form communication

402

Determine a first dataset

404

Determine a first portion of the first dataset

406

Determine, based on the first portion, a first response

408

Generate a second short-form communication

410

SYSTEMS AND METHODS FOR SERVING SHORT-FORM DATA REQUESTS RELATED TO USAGE OF CLOUD COMPUTING RESOURCES

BACKGROUND

In recent years, many companies have moved away from using their own dedicated hardware in many computing areas. Instead, these companies are shifting toward cloud computing resources, which are on-demand computer system resources, especially those that cater to data storage and computing power, and for which the companies do not have direct and/or active management over. In many cases, these cloud computing resources are physically hosted at data centers located in geographically dispersed locations and are available to the companies via the Internet.

SUMMARY

Systems and methods are disclosed herein for improvements in cloud services. While cloud services have exponentially increased the amount of computing resources available to companies, the needs of those companies for cloud services have also increased. Thus, in many cases, the cloud services provider is continually searching for more efficient techniques for managing cloud computing resources. One such technique includes the sharing of usage metrics for cloud computing resources.

However, sharing of usage metrics faces several fundamental technical challenges. First, usage metrics may be based on copious amounts of real-time data. This data may require constant monitoring as well as various levels of security and/or access restrictions. For example, relevant data may be split around numerous different datasets and/or dashboards. Each dataset and/or dashboard may have its own set of required credentials and/or access requirements. Moreover, even if this data can be accessed, the data still needs to be formatted into a format that is usable for a user. As such, the sharing of this data, particularly in a format that is usable, is not possible in conventional systems.

The systems and methods disclosed herein allow the cloud services to better apportion cloud resources between multiple cloud services recipients. For example, the systems and methods may provide commonly accessed metrics in a shorter amount of time than if the user were to navigate to the respective data source, browse through their dashboards, and query their own application. The systems and methods accomplish this by both accessing the relevant data (e.g., despite existing security and/or access restrictions) as well as providing it in a short-form communication (e.g., in a format that is usable). The systems and methods accomplish this by first determining a dataset for generating a response to a query and then determining a portion of the dataset that is available to the user. The system may then use the data that is available to determine the response to the query. The system may then generate a short-form communication based on the response.

In some aspects, systems and methods for serving short-form data requests related to usage of cloud computing resources are described. For example, the system may receive, from a first user via a user interface, a first short-form communication comprising a first query for a first metric on cloud computing resource usage. The system may determine a first dataset for generating a first response to the first query. The system may determine a first portion of the first dataset that is available to the first user. The system may determine, based on the first portion, the first response corresponding to the first metric. The system may generate for display, via the user interface, a second short-form communication, wherein the second short-form communication comprises the first response.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a." "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
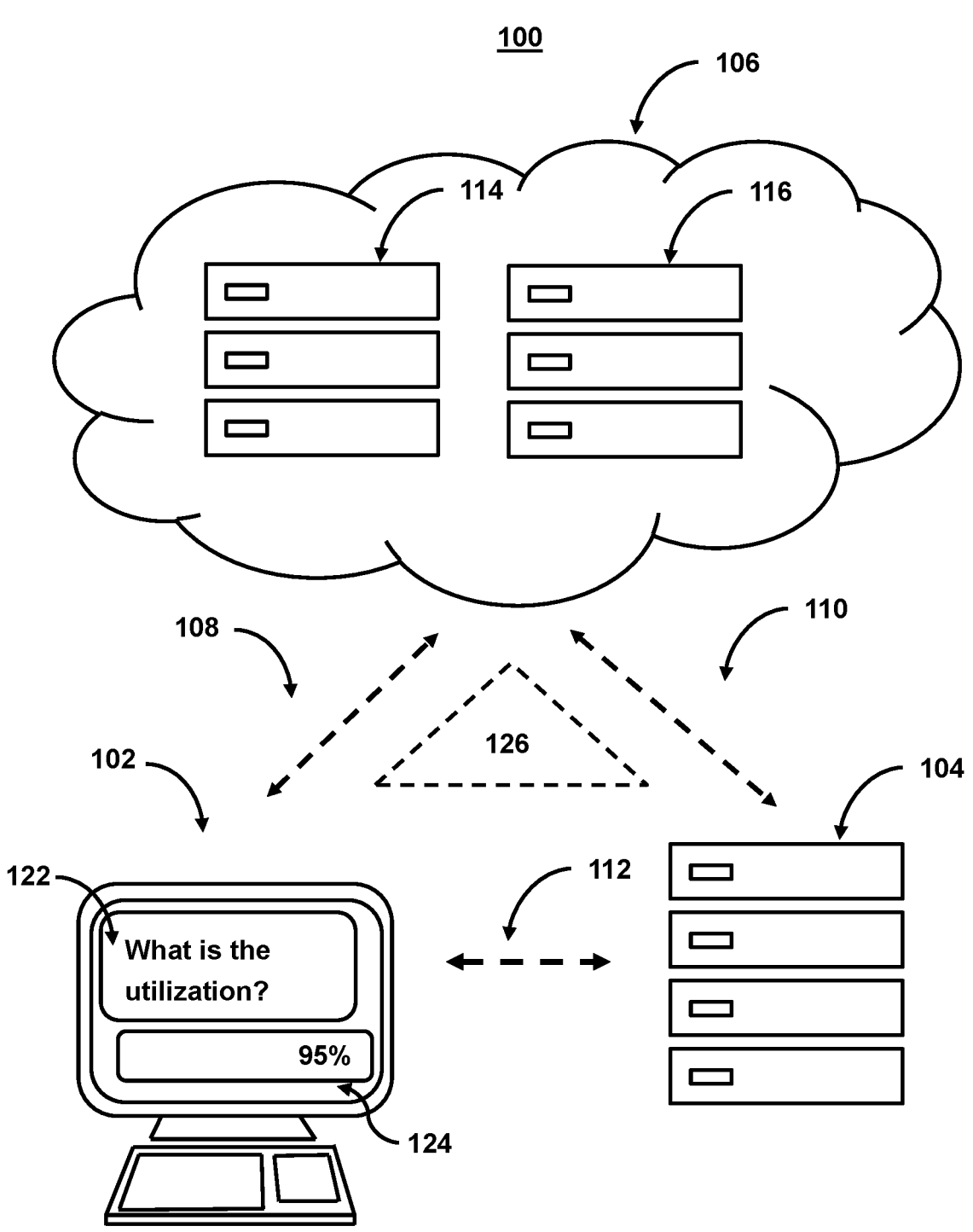
FIGS. 1A-B show systems for serving short-form data requests related to usage of cloud computing resources, in accordance with one or more embodiments.
Figure 1B:
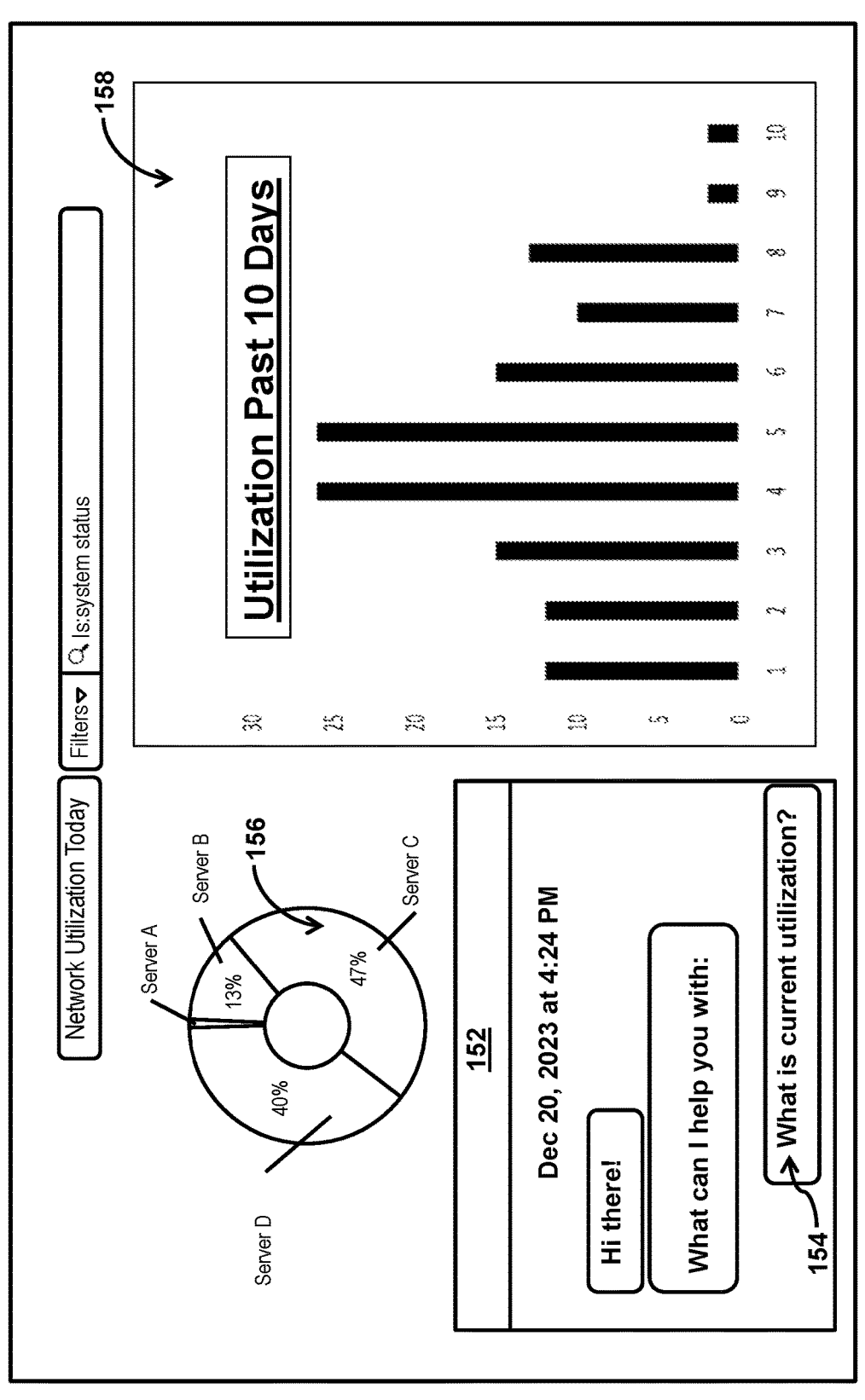

FIGS. 1A-B show systems for serving short-form data requests related to usage of cloud computing resources, in accordance with one or more embodiments. FIG. 1A shows a system 100 for provisioning cloud services, in accordance with one or more embodiments. As shown in FIG. 1, system 100 may include client device 102, client device 104, or other components. Each of client devices 102 and 104 may include any type of mobile terminal, fixed terminal, or other device. Each of these devices may receive content and data via input/output (I/O) paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 102 and 104 may include a desktop computer, a notebook computer, a tablet computer, a smartphone, a wearable device, or other client device. Users may, for instance, utilize one or more client devices 102 and 104 to interact with one another, one or more servers, or other components of system 100. It should be noted that, while one or more operations are described herein as being performed by particular components of client devices 102 or 104, those operations may, in some embodiments, be performed by other components of client devices 102 or 104 or other components of system 100. As an example, while one or more operations are described herein as being performed by components of client device 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

As shown in FIG. 1A, client device 102 may comprise a user interface (e.g., as shown in FIG. 1B) for exchanging short-form communications. As referred to herein, a "user interface" may comprise a human-computer interaction and communication in a device, and may include display screens, keyboards, a mouse, and the appearance of a desktop. For example, a user interface may comprise a way a user interacts with an application or a website to access content.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

System 100 may receive, from a first user via a user interface, a first short-form communication (e.g., communication 122). For example, short-form communications may refer to methods of sending messages, especially long-distance methods such as radio, telephone, and internet, and to the messages themselves. In particular, the short-form communications may be related to particular communication protocols used for messaging applications such as Short Message/Messaging Service ("SMS") or Multimedia Messaging Service ("MMS"). SMS comprises a text messaging service component of most telephone, Internet, and mobile device systems. It uses standardized communication protocols that let mobile devices exchange short text messages. An intermediary service can facilitate a text-to-voice conversion to be sent to landlines. MMS may refer to a text with an attached file, like a picture, video, emoji, or a website link.

In some embodiments, short-form communications may be encoded using a variety of alphabets: the default GSM 7-bit alphabet, the 8-bit data alphabet, and/or the 16-bit UCS-2 alphabet. The system may select the alphabet based on the user (e.g., based on user profile data retrieved from a user). Depending on which alphabet the system selects, the system may set a maximum individual short-form communication size of 160 7-bit characters, 140 8-bit characters, and/or 70 16-bit characters.

In some embodiments, the system may send short-form communications of larger content (concatenated SMS, multipart or segmented SMS, or "long SMS") using multiple messages, in which case each communication may start with a User Data Header (UDH) containing segmentation information. Since UDH is part of the payload, the number of available characters per segment may be lower: 153 for 7-bit encoding, 134 for 8-bit encoding and 67 for 16-bit encoding. The receiving system may then be responsible for reassembling the communications and presenting it to the user as one long communication.

The short-form communication may comprise a first query for a first metric on cloud computing resource usage. As referred to herein, a metric may comprise any quantitative or qualitative assessment. For example, a metric based on a cloud computing resource usage may refer to a manner or use of a cloud computing resource, a function provided by a cloud computing resource, a utilization (e.g., in a percentage, frequency, amount, and/or other denomination) of a cloud computing resource, and/or any other characteristic of, or relation to a cloud computing resource.

The short-form communication may comprise a text string. For example, while the short-form communication may comprise any content. In many instances, the short-form communication may comprise a text string. For example, a text string, also known as a string or simply as text, is a group of characters that are used as data (e.g., for a data input). Text strings are most often comprised of words, but may also include letters, numbers, special characters, symbols, and/or number signs.

System 100 may then generate for display, via the user interface, a second short-form communication (e.g., communication 124), wherein the second short-form communication comprises the response to the query (e.g., communication 122). For example, in response to an initial short-form communication, the system may generate a second short-from communication. In some embodiments, the system may use an application programming interface ("API").

The API may include a set of Hypertext Transfer Protocol (HTTP) request messages and a definition of the structure of response messages. In certain aspects, the API may allow a software application, which is written against the API and installed on a client (such as, for example, a computing device associated with a dealer) to exchange data with a server (such as, for example, a computing system associated with a financial service provider) that implements the API, in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally or alternatively, the client may send GET and POST requests with JSON serialized parameters in the body. Preferably, the requests with JSON serialized parameters use "application/json" content type. In another aspect, the API design may also require the server implementing the API to return messages in JSON format in response to the request calls from the client.

For example, system 100 also includes API layer 126. API layer 126 may allow the system to generate summaries across different devices. API layer 126 (which may be A REST or Web services API layer) may provide a decoupled interface to data and/or the functionality of one or more applications. API layer 126 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 126 may use various architectural arrangements. For example, system 100 may be partially based on API layer 126, such that there is strong adoption of SOAP and RESTful web services, using resources like Service Repository and Developer Portal, but with low governance, standardization, and separation of concerns. Alternatively, system 100 may be fully based on API layer 126, such that separation of concerns between layers like API layer 126, services, and applications are in place.

In some embodiments, the system architecture may use a microservice approach. Such systems may use two types of layers: front-end layer and back-end layer where microservices reside. In this kind of architecture, the role of the API layer 126 may provide integration between front end and back end. In such cases, API layer 126 may use RESTful APIs (exposition to front end or even communication between microservices). API layer 126 may use AMQP (e.g., Kafka, RabbitMQ, etc.). API layer 126 may use incipient usage of new communications protocols such as gRPC, Thrift, etc.

In some embodiments, the system architecture may use an open API approach. In such cases, API layer 126 may use commercial or open source API Platforms and their modules. API layer 126 may use a developer portal. API layer 126 may use strong security constraints applying WAF and DDOS protection, and API layer 126 may use RESTful APIs as standard for external integration.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In FIG. 1, client device 102 may represent the client device of a first cloud services recipient. For example, the cloud service may be made available to multiple client devices (e.g., end users) on-demand via the Internet (e.g., path 108 or 110) from a cloud services provider's servers (e.g., server 114 and server 116) as opposed to end users using servers at the end user's location and/or owned by the end user. It should be noted that cloud service 106 includes server 114 and server 116; however, cloud service 106 may include additional components. In some embodiments, server 114 and server 116 may represent edge servers that are geographically close to a represented client device. In such embodiments, edge server 114 and edge server 116 may be further connected to a central server in cloud service 106. The central server may assign and select server 114 and/or server 116 to a given client device, application, and/or end user based on the geographic location of the client device with respect to the edge server, based on the network conditions along a given network path, and/or other quality of service conditions on the network.

Cloud service 106 may be structured according to one or more service-oriented architecture models. For example, cloud service 106 may be designed to provide easy, scalable access to applications, resources, and services. In particular, cloud service 106 may dynamically scale to meet the needs of client device 102 and client device 104. In some embodiments, the cloud service 106 may supply some or all cloud resources (e.g., hardware and software necessary for all or some of the operation of one or more cloud services) to a cloud services recipient. The cloud services provider may provide cloud services such as online data storage and backup solutions, web based e-mail services, hosted office suites and document collaboration services, database processing, managed technical support services, and/or general computer power and data processing. In some embodiments, the cloud resource may be a network, server, storage device, application, and/or service. Notably, cloud service models may use a multitude of different formats each with their own benefits and weaknesses to both the cloud services provider and the cloud services recipient. In most models, these benefits and weaknesses are balanced based on the needs and/or business goals of the cloud services provider and the cloud services recipient. However, through the sharing of estimated and actual usage data of cloud services recipients and the cloud services provider, including the information on application usage in that data, the cloud services provider and the cloud services recipient may better balance these weaknesses and benefits. In particular, this balance allows the cloud services provider and the cloud services recipient to switch from one model to another and/or deviate from traditional model formats. These deviations can be accomplished through the apportionment methods described below. For example, by analyzing information included in the shared data (e.g., information about one or more applications that use the cloud resources), the cloud services provider may categorize the applications and/or the functions of those applications into authorized and unauthorized uses, the determination of which is used to further efficiently apportioning the cloud services resources.

For example, cloud service 106 may be structured according to an infrastructure as a service (IaaS) model in which online services that provide high-level APIs are used to dereference various low-level details of underlying network infrastructure like physical computing resources, location, data partitioning, scaling, security, backup etc. In such embodiments, a hypervisor runs the virtual machines as guests, and pools of hypervisors within the cloud operational system can support large numbers of virtual machines and the ability to scale services up and down according to the end users' varying requirements. In such embodiments, where the client device may deploy and run arbitrary software, which can include operating systems and applications. While the client device does not manage or control the underlying cloud infrastructure, it may have control over operating systems, storage, and deployed applications. IaaS-cloud providers supply these resources on-demand from their large pools of equipment installed in data centers. For wide-area connectivity, customers can use either the Internet or carrier clouds (dedicated virtual private networks). To deploy their applications, cloud users install operating-system images and their application software on the cloud infrastructure. In this model, the end user patches and maintains the operating systems and the application software, and the end user has access to virtual machines, servers, storage, load balances, etc.

Cloud service 106 may also be structured as a platform as a service (PaaS) model. In such embodiments, cloud service 106 deploys onto the cloud infrastructure consumer-created or acquired applications created using programming languages, libraries, services, and tools supported by the cloud services provider. The end user does not manage or control the underlying cloud infrastructure including network, servers, operating systems, or storage, but has control over the deployed applications and possibly configuration settings for the application-hosting environment. In this model, the end users do not manage or control the underlying cloud infrastructure including network, servers, operating systems, or storage, but have control over the deployed applications and possibly configuration settings for the application-hosting environment, and the end user has access to execution runtime code, databases, web servers, development tools, etc.

Cloud service 106 may also be structured as a software as a service (SaaS) model. In such embodiments, cloud service 106 allows the end users to use the cloud services provider's applications running on a cloud infrastructure. The applications are accessible from various client devices through either a thin client interface, such as a web browser (e.g., web-based email), or a program interface. The end user does not manage or control the underlying cloud infrastructure including network, servers, operating systems, storage, or even individual application capabilities, with the possible exception of limited user-specific application configuration settings.

Depending on the model or models used by the cloud services provider the manner in which cloud services are apportioned may change. For example, in a PaaS model in order to apportion the cloud service resources the cloud service 106 may install one or more applications of the first cloud services recipient on hardware of a cloud services provider. In another example, in a SaaS model in order to apportion the cloud service resources, cloud service 106 may set one or more limits for I/O operations per second for one or more applications of the first cloud services recipient.

It should be noted that in some embodiments, the cloud service may apportion cloud service resources according to those accustomed with other models. For example, as stated below, cloud service 106 may receive output files that include specific information that allows cloud service 106 to better predict actual usage of a cloud services recipient as well as authorized use. Because cloud service 106 is better able to predict actual and/or authorized use, cloud service 106 may apportion cloud services using techniques not accustomed to that model. For example, in a SaaS model, cloud service 106 may install one or more applications of the first cloud services recipient on hardware of a cloud services provider. In another example, in a PaaS model in order to apportion the cloud service resources, cloud service 106 may set one or more limits for I/O operations per second for one or more applications of the first cloud services recipient.

161447144.1 Page 10

FIG. 1B shows an illustrative user interface for facilitating short-form communications, in accordance with one or more embodiments. For example, user interface 150 may represent a user interface for submitting short-form communications and receiving responses thereto. For example, a user may enter a short-form communication (e.g., communication 154) into a chat window (e.g., window 152). In response, the system may generate one or more responses (e.g., in window 152) as well as additional content. For example, graph 156 and graph 158 may include graphical representations of cloud computing resources and/or other data.

In response to the request, the system may determine a dataset for generating a response to the query as well as a portion of that dataset that is available to the user. In some embodiments, the system may determine data that is available to a user based on characteristics of a user (or user account) submitting a request. To do so, the system may access a user profile.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences (e.g., formatting preferences), and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring the user.

The system may use one or more user characteristics to determine what data is available to a user. For example, the system may determine what data is available to a user based on a security credential, role, team, API, etc. The system may then filter available data to include only the data available to the user.

In some embodiments, the user characteristic may comprise a request characteristic. As referred to herein, "a request characteristic" may include a request and/or metadata related to the request. For example, a request characteristic may comprise keywords, team designations for a user, a role of the user, an application requiring the metric, a user of the metric, a type of data comprising the metric, an API required, etc. The system may access a lookup table of key datapoints corresponding to request characteristics (e.g., keywords, team, user role, application, type of data, API, etc.) to determine what data portion or datasets are required to generate a metric.

In another example, the system may perform additional functions and/or calculations based on short-form communications. For example, the system may generate a probability of prediction of future usage. For example, in some embodiments, the system may receive multi-modal data. The multi-modal data may comprise data from a plurality of sources. For example, the data may comprise data from numerous different network domains and/or network resources. In some embodiments, the data may comprise state data that describes a current state of a domain and/or resource. The state may indicate a current amount of data processing load for a domain and/or resource.

In some embodiments, the data may comprise cloud computing data from a plurality of sources. For example, the system may utilize data mining to extract patterns among multiple computing loads, and having distilled these patterns, assign weights for a given event category based on correlated impact. Based on the patterns and weighting, the system may train a machine learning model.

For example, to classify a portion of a time series data feed, the system uses transition probability matrices to forecast the probability of processing loads at a point (e.g., a future date). For example, for the probability of moving from state i to state j, the transition probability matrix P is given by using $P_{ij}$ as the ith row and jth column element for finite state space $\Sigma$ with cardinality S.

The distribution over states may be written as a probability distribution vector x(t) of length S at time t to forecast the future state distribution of x(t) n statements in advance. For example, the model outlines the relation that is the conditional probability distribution of future states of the process which depends only upon the present state, and not on the sequence of events that preceded it.

In some embodiments, the system may use one or more prediction models to predict an actual and/or authorized use of cloud resources. The prediction model may include one or more artificial intelligence models, including, but not limited to, machine learning, deep learning, etc. (referred to collectively herein as artificial intelligence models, machine learning models, or simply models).

As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem-solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

Figure 2:
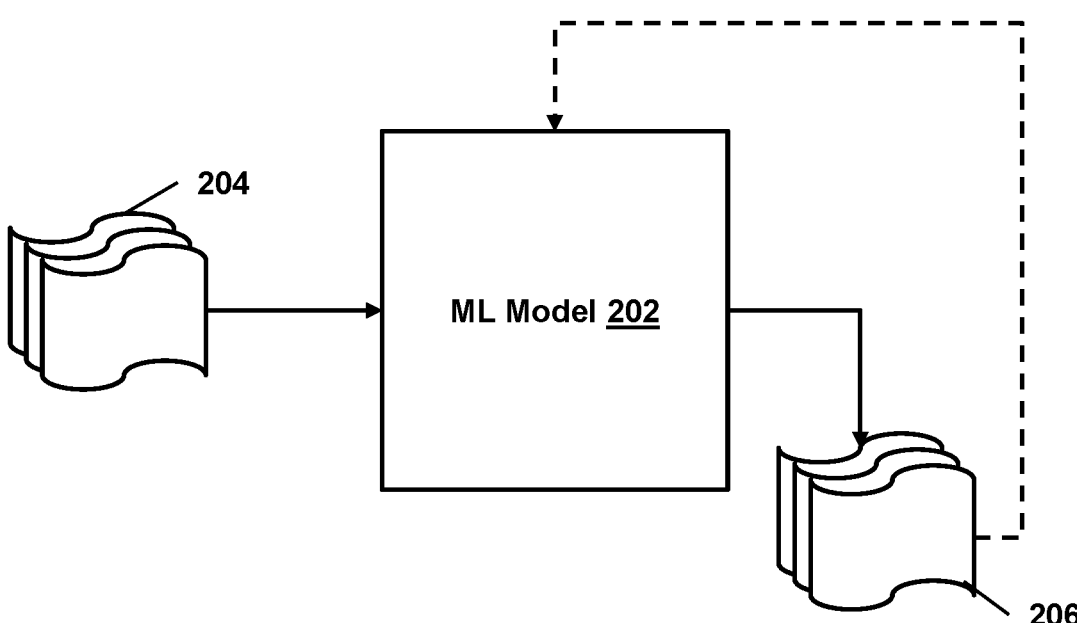
FIG. 2 shows an artificial intelligence model configured to serve short-form data requests, in accordance with one or more embodiments.

FIG. 2 shows an artificial intelligence model configured to serve short-form data requests, in accordance with one or more embodiments. System 200 includes artificial intelligence model 202 may take inputs 204 and provide outputs 206. For example, inputs may include information received from output files such as an actual amount of cloud resources used by a first cloud services recipient during a first time period and first time period application information. The first time period application information may include information about one or more applications that used cloud resources during the first time period. This information may further include specific information that may be accessible, but not modifiable by cloud service 106. For example, the information may include lengths of code of one or more applications that used cloud resources and/or a number of function calls of one or more applications that used cloud resources. This information may be compared to similar information from different time periods to determine peculiarities in the applications.

For example, cloud services recipients may in some instances use cloud resources in an unauthorized manner. This unauthorized manner may include a use that is illegal and/or against the terms of use of the cloud service. For example, a first cloud services recipient may artificially increase its use of cloud resources (e.g., by artificially increasing the length of code of its application and/or the number of function calls) in order to prevent other cloud services recipients from using the cloud resources and/or to lower the performance of the cloud resources. The first cloud services recipient may therefore provide itself a competitive advantage by decreasing its competitor's cloud services performance. By monitoring this information, the system may detect these unauthorized uses. In another example, the terms of service of the cloud services provider may prevent the use of cloud resources for commercial use, training machine learning algorithms, mining cryptocurrencies, and/or other resource intense operations. By monitoring the length of code and/or function calls, the system may determine when these unauthorized uses are occurring. For example, the cloud services provider may monitor the average length of code of an application performing a given function from one time period to another to detect discrepancies. Likewise, the cloud services provider may monitor the average number of function calls of an application performing a given function from one time period to another to detect discrepancies. If the length of code and/or function calls increases/decreases at a given time period, which has correlations to higher performance of a second cloud services recipient, the cloud services provider may detect the unauthorized use. Slight deviations as well as compensating for the actual uses of the first cloud services recipient may in some embodiments, necessitate large data sets that may be interpreted by the machine learning model.

In another example, inputs may also include estimated and actual usage data as provided by cloud services recipients during various time periods. This information may be compared to similar information from different time periods to predict periods of high or lower use and/or the need for more cloud service resources as well as the particular cloud services recipients and/or types of cloud services recipients that may experience the high or low period of use. Additionally, the system may determine particular cloud services recipients that have similar patterns of use. For example, if the system determines that client devices (e.g., client device 102 (FIG. 1A) and client device 104 (FIG. 1A)) are associated with cloud services recipients that both have a high amount of use during a given time period (e.g., a weekend), the system (e.g., cloud service 106 (FIG. 1)) may select different physical hosts and/or physical hosts located along different network routes in order to minimize resource strain. For example, in response to this determination, the system may select a first cloud services physical host (e.g., server 114 (FIG. 1A)) for the first cloud services recipient (e.g., client device 102 (FIG. 1A)) for a time period and a second cloud services physical host (e.g., server 116 (FIG. 1A)) for the second cloud services recipient (e.g., client device 104 (FIG. 1A)) for the time period based on the amount of cloud resources apportioned to the first cloud services recipient for the time period and on the amount of cloud resources apportioned to the second cloud services recipient for the time period (e.g., based on the predicted actual and/or authorized use of each cloud services recipient).

In one use case, outputs 206 may be fed back to artificial intelligence model 202 as input to train artificial intelligence model 202 (e.g., alone or in conjunction with user indications of the accuracy of outputs 206, labels associated with the inputs, or with other reference feedback information). In another use case, artificial intelligence model 202 may update its configurations (e.g., weights, biases, or other parameters) based on its assessment of its prediction (e.g., outputs 206) and reference feedback information (e.g., user indication of accuracy, reference labels, or other information). In another use case, where artificial intelligence model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the artificial intelligence model 202 may be trained to generate better predictions.

Figure 3:
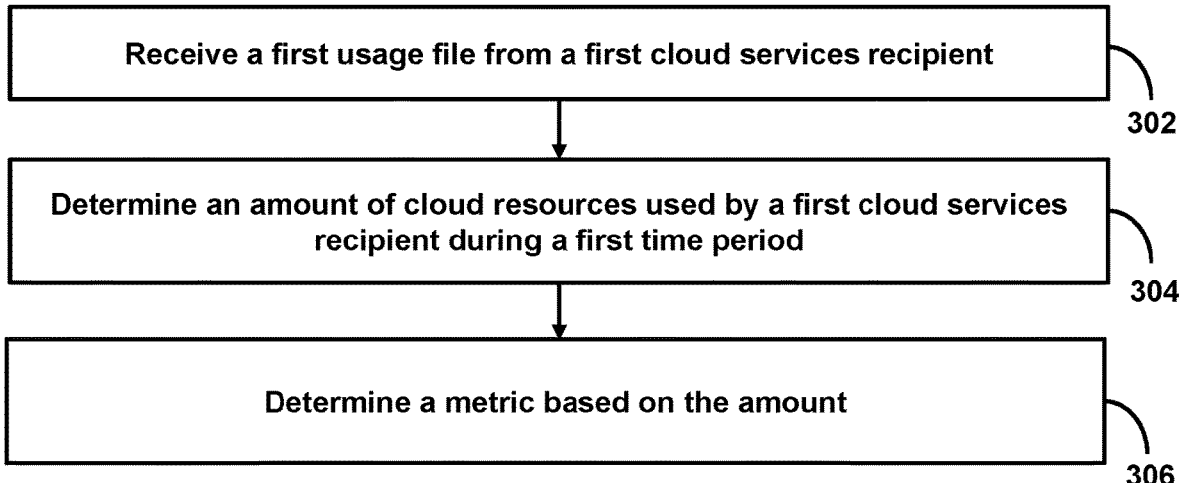
FIG. 3 shows a flowchart of a process for determining cloud resource usage, in accordance with one or more embodiments.

FIG. 3 shows a flowchart of a process for determining cloud resource usage, in accordance with one or more embodiments. For example, process 300 may represent the steps taken by one or more devices in determining usage of a cloud computing resource and/or a metric corresponding to the usage.

At step 302, process 300 (e.g., via control circuitry at server 114 (FIG. 1)) receives a first usage file from a first cloud services recipient, wherein the first usage file from the first cloud services recipient includes an amount of cloud resources used by a first cloud services recipient during a first time period. For example, server 114 (FIG. 1) may receive a first usage file from a first cloud services recipient (client device 102 (FIG. 1)), in which the first usage file includes a first amount of a cloud resource to be used by the first cloud services recipient during a first time period (e.g., a given hour, day, week, etc.).

At step 304, process 300 (e.g., via control circuitry at server 114 (FIG. 1)) determines an amount of cloud resources to be used by the first cloud services recipient during the first time period. It should be noted that the system may determine any quantitative or qualitative metric of cloud resource usage. For example, the system may use a percentage, factor, or some other numerical estimate. It should be further noted that the ratio (or other metric of quantitative or qualitative relation) may be based on information from multiple cloud services recipients, files, and/or time periods. It should also be noted that the metric may be continually and dynamically updated (e.g., as more information is received).

At step 306, process 300 (e.g., via control circuitry at server 114 (FIG. 1)) determines a metric based on the amount. For example, the system may determine any quantitative or qualitative metric of cloud resource usage. For example, the system may use a percentage, factor, or some other numerical estimate. It should be further noted that the ratio (or other metric of quantitative or qualitative relation) may be based on information from multiple cloud services recipients, files, and/or time periods. It should also be noted that the metric may be continually and dynamically updated (e.g., as more information is received). In some embodiments, an output from the first cloud services recipient may further include first time period application information which includes information about one or more applications that used cloud resources during the first time period.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 3.

Figure 4:
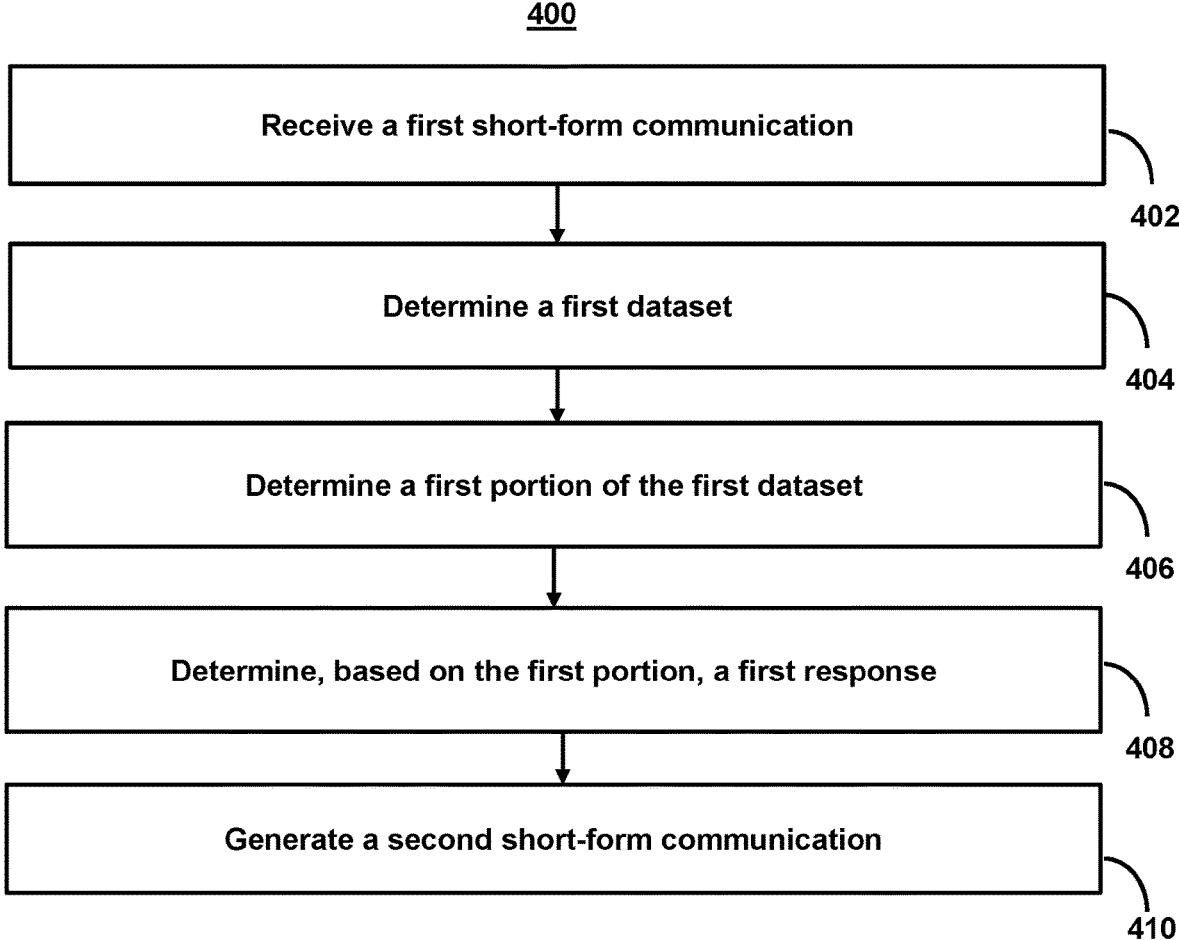
FIG. 4 shows a flowchart of a process for serving short-form data requests, in accordance with one or more embodiments.

FIG. 4 shows a flowchart of a process for serving short-form data requests, in accordance with one or more embodiments.

At step 402, process 400 (e.g., via control circuitry at server 114 (FIG. 1)) receives a first short-form communication. For example, the system may receive, from a first user via a user interface, a first short-form communication comprising a first query for a first metric on cloud computing resource usage. For example, the system may provide an easy to access interface for receiving user requests for cloud computing resources. In some embodiments, the system may receive a request via a messaging window and/or chatbot application.

In some embodiments, the first query may comprise a request for an incident management system. For example, the system may determine if an incident has been reviewed according to an incident workflow. The system may then perform the checks (e.g., generate the first metric) and send a response based on the checks. In another example, the first query may comprise a request for a release management system. In such cases, the system may determine whether a new application has met all requirements for release. The system may then do the checks (e.g., generate the first metric) and send a response based on the checks. In another example, the first query may comprise a request for a vulnerability management system to determine if a new application has met all vulnerability requirements. The system may determine if the requirements are met and generate the response.

At step 404, process 400 (e.g., via control circuitry at server 114 (FIG. 1)) determines a first dataset. For example, the system may determine a first dataset for generating a first response to the first query. For example, the system may determine the data necessary to generate a response and/or a metric for that response.

In some embodiments, the system may use one or more characteristics about a request to determine what data is needed to generate a metric. For example, the system may determine what data is needed based on keywords in the request, team designations for a user, a role of the user, an application requiring the metric, a user of the metric, a type of data comprising the metric, an API required, etc. For example, the system may retrieve a keyword from the first query. The system may input the keyword into a database, wherein the database lists dataset locations used to generate requested metrics. The system may receive an output from the database, wherein the output identifies the first dataset.

In some embodiments, the system may determine a type of application that is making a request. The system may then determine the data needed (and/or formatting required) to respond to the request. For example, the system may retrieve an application corresponding to the first query. The system may input the application into a database, wherein the database lists dataset locations used to generate requested metrics corresponding to applications. The system may receive an output from the database, wherein the output identifies the first dataset.

In some embodiments, the system may determine an API that is making a request. The system may then determine the data needed (and/or formatting required) to respond to the request. The system may retrieve an application programming interface corresponding to the first query. The system may input the application programming interface into a database, wherein the database lists dataset locations used to generate requested metrics corresponding to application programming interfaces. The system may receive an output from the database, wherein the output identifies the first dataset.

In some embodiments, the system may determine information about how a request was received and/or other metadata about the request. For example, the system may determine a frequency at which a user makes a request. The system may then determine the data needed (and/or formatting required) to respond to the request based on the frequency. For example, the system may retrieve a frequency corresponding to the first query. The system may input the frequency into a database, wherein the database lists dataset locations used to generate requested metrics corresponding to the frequency. The system may receive an output from the database, wherein the output identifies the first dataset.

In some embodiments, the system may determine additional information about a request prior to receiving the short-form communication. For example, the system may retrieve user profile information, current progress information, etc. The system may then modify one or more requests based on the request characteristic. For example, the system may, prior to receiving the first short-form communication, determine a first request characteristic for the first short-form communication. The system may select the first dataset from a plurality of datasets based on the first request characteristic.

At step 406, process 400 (e.g., via control circuitry at server 114 (FIG. 1)) determines a first portion of the first dataset. For example, the system may determine a first portion of the first dataset that is available to the first user. In some embodiments, the system may determine data that is available to a user based on characteristics of a user (or user account) submitting a request.

In some embodiments, the system may use one or more user characteristics to determine what data is available to a user. For example, the system may determine what data is available to a user based on a security credential, role, team, API, etc. The system may then filter available data to include only the data available to the user. For example, the system may retrieve a user profile for the first user. The system may retrieve a user profile characteristic from the user profile. The system may determine that the first portion is available to the first user based on the user profile characteristic.

In some embodiments, the system may determine a security credential for the user. The system may then input the security credential into a database that lists datasets (or portions thereof) available to the user. For example, the system may retrieve a security credential for the first user. The system may input the security credential into a database, wherein the database lists dataset portions available to inputted security credentials. The system may receive an output from the database, wherein the output indicates that the first portion of the first dataset is available to the security credential. The system may determine that the first portion is available to the first user based on the output.

In some embodiments, the system may determine a team (e.g., a team, group, and/or other subdivision of an entity) for the user. The system may then input the team into a database that lists datasets (or portions thereof) available to the user. For example, the system may retrieve a team for the first user. The system may input the team into a database, wherein the database lists dataset portions available to inputted teams. The system may receive an output from the database, wherein the output indicates that the first portion of the first dataset is available to the team. The system may determine that the first portion is available to the first user based on the output.

In some embodiments, the system may determine a role (e.g., a role or function of a team, group, and/or other entity) for the user. The system may then input the team into a database that lists datasets (or portions thereof) available to the user. For example, the system may retrieve a role for the first user. The system may input the role into a database, wherein the database lists dataset portions available to inputted roles. The system may receive an output from the database, wherein the output indicates that the first portion of the first dataset is available to the role. The system may determine that the first portion is available to the first user based on the output.

In some embodiments, the system may use one or more user characteristics to determine what data is available to a user. In such cases, the system may transmit one or more requests for needed information. The system may determine a first user characteristic of the first user. The system may transmit a request for a second user characteristic of the first user. The system may receive the second user characteristic of the first user. The system may determine that the first portion is available to the first user based on the second user characteristic.

In some embodiments, the system may determine that the data available to the user is not sufficient to access data needed to generate the first metric. In such cases, the system may transmit a request, link, and/or notification to the user indicating a required user characteristic (e.g., security credential) needed to access the data. For example, the system may determine that the first portion is not sufficient to determine the first metric. The system may determine a user characteristic required to access a portion of data sufficient to determine the first metric. The system may populate the first response with a request to transmit the user characteristic.

At step 408, process 400 (e.g., via control circuitry at server 114 (FIG. 1)) determines, based on the first portion, a first response. For example, the system may determine, based on the first portion, the first response corresponding to the first metric. For example, the system may retrieve textual or graphical data related to the cloud computing usage. In some embodiments, the system may access summary or other information that is accessible to a wide variety of users.

At step 410, process 400 (e.g., via control circuitry at server 114 (FIG. 1)) generates a second short-form communication. For example, the system may generate for display, via the user interface, a second short-form communication, wherein the second short-form communication comprises the first response. The system may then transmit the second short-form communication back to a requesting user (e.g., via a chatbot application).

In some embodiments, the system may format a short-form communication based on the requesting user. For example, the system may retrieve a user profile for the first user. The system may retrieve a formatting preference from the user profile. The system may determine a formatting for the second short-form communication based on the formatting preference.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1A-B could be used to perform one or more of the steps in FIG. 4.

Although the present invention has been described in detail for the purpose of illustration based on what is currently considered to be the most practical and preferred embodiments, it is to be understood that such detail is solely for that purpose and that the invention is not limited to the disclosed embodiments, but to the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for serving short-form data requests related to usage of cloud computing resources.

2. The method of any one of the preceding embodiments, further comprising: receiving, from a first user via a user interface, a first short-form communication comprising a first query for a first metric on cloud computing resource usage; determining a first dataset for generating a first response to the first query; determining a first portion of the first dataset that is available to the first user; determining, based on the first portion, the first response corresponding to the first metric; and generating for display, via the user interface, a second short-form communication, wherein the second short-form communication comprises the first response.

3. The method of any one of the preceding embodiments, wherein determining the first portion of the first dataset that is available to the first user further comprises: retrieving a user profile for the first user; retrieving a user profile characteristic from the user profile; and determining that the first portion is available to the first user based on the user profile characteristic.

4. The method of any one of the preceding embodiments, wherein determining the first portion of the first dataset that is available to the first user further comprises: retrieving a security credential for the first user; inputting the security credential into a database, wherein the database comprises dataset portions available to inputted security credentials; receiving an output from the database, wherein the output indicates that the first portion of the first dataset is available to the security credential; and determining that the first portion is available to the first user based on the output.

5. The method of any one of the preceding embodiments, wherein determining the first portion of the first dataset that is available to the first user further comprises: retrieving a team for the first user; inputting the team into a database, wherein the database comprises dataset portions available to inputted teams; receiving an output from the database, wherein the output indicates that the first portion of the first dataset is available to the team; and determining that the first portion is available to the first user based on the output.

6. The method of any one of the preceding embodiments, wherein determining the first portion of the first dataset that is available to the first user further comprises: retrieving a role for the first user; inputting the role into a database, wherein the database comprises dataset portions available to inputted roles; receiving an output from the database, wherein the output indicates that the first portion of the first dataset is available to the role; and determining that the first portion is available to the first user based on the output.

7. The method of any one of the preceding embodiments, wherein determining the first portion of the first dataset that is available to the first user further comprises: determining a first user characteristic of the first user; transmitting a request for a second user characteristic of the first user; receiving the second user characteristic of the first user; and determining that the first portion is available to the first user based on the second user characteristic.

8. The method of any one of the preceding embodiments, wherein determining, based on the first portion, the first response corresponding to the first metric further comprises: determining that the first portion is not sufficient to determine the first metric; determining a user characteristic required to access a portion of data sufficient to determine the first metric; and populating the first response with a request to transmit the user characteristic.

9. The method of any one of the preceding embodiments, wherein determining the first dataset for generating the first response to the first query further comprises: retrieving a keyword from the first query; inputting the keyword into a database, wherein the database comprises dataset locations used to generate requested metrics; and receiving an output from the database, wherein the output identifies the first dataset.

10. The method of any one of the preceding embodiments, wherein determining the first dataset for generating the first response to the first query further comprises: retrieving an application corresponding to the first query; inputting the application into a database, wherein the database comprises dataset locations used to generate requested metrics corresponding to applications; and receiving an output from the database, wherein the output identifies the first dataset.

11. The method of any one of the preceding embodiments, wherein determining the first dataset for generating the first response to the first query further comprises: retrieving an application programming interface corresponding to the first query; inputting the application programming interface into a database, wherein the database comprises dataset locations used to generate requested metrics corresponding to application programming interfaces; and receiving an output from the database, wherein the output identifies the first dataset.

12. The method of any one of the preceding embodiments, wherein determining the first dataset for generating the first response to the first query further comprises: retrieving a frequency corresponding to the first query; inputting the frequency into a database, wherein the database comprises dataset locations used to generate requested metrics corresponding to frequency; and receiving an output from the database, wherein the output identifies the first dataset.

13. The method of any one of the preceding embodiments, wherein determining the first dataset for generating the first response to the first query further comprises: prior to receiving the first short-form communication, determining a first request characteristic for the first short-form communication; and selecting the first dataset from a plurality of datasets based on the first request characteristic.

14. The method of any one of the preceding embodiments, wherein generating for display the second short-form communication further comprises: retrieving a user profile for the first user; retrieving a formatting preference from the user profile; and determining a formatting for the second short-form communication based on the formatting preference.

15. A tangible, non-transitory, machine-readable medium storing instructions that, when executed by a data processing apparatus, cause the data processing apparatus to perform operations comprising those of any of embodiments 1-14.

16. A system comprising: one or more processors; and memory storing instructions that, when executed by the processors, cause the processors to effectuate operations comprising those of any of embodiments 1-14.

What is claimed is:

1. A system for serving short-form data requests related to usage of cloud computing resources, the system comprising:
one or more processors; and
a non-transitory, computer-readable medium comprising instructions recorded thereon that when executed by the one or more processors cause operations comprising:
receiving, from a first user via a user interface, a first short-form communication comprising a first query for a first metric at a first point in time on cloud computing resource usage, wherein the first short-form communication comprises a first text string, wherein the first metric is a quantitative or qualitative assessment of the cloud computing resource usage;
determining a first dataset, from a plurality of datasets, for generating a first response to the first query, wherein the first dataset comprises data corresponding to the first metric, and wherein the first dataset comprises a first portion and a second portion;
extracting, from the first portion, a data utilization pattern for the cloud computing resource usage;
extracting, from the second portion, a present state of the cloud computing resource usage;

forecasting the first metric at the first point in time by generating a probability distribution vector representing probability distributions of future states of the cloud computing resource usage based on the data utilization pattern and the present state;
determining a formatting for a second short-form communication based on a formatting preference; and
generating for display, via the user interface, the second short-form communication, wherein the second short-form communication comprises the first response.

2. A method for serving short-form data requests related to usage of cloud computing resources, the method comprising:
receiving, from a first user via a user interface, a first short-form communication comprising a first query for a first metric on cloud computing resource usage, wherein the first metric is a quantitative or qualitative assessment of the cloud computing resource usage;
determining a first dataset for generating a first response to the first query, wherein the first dataset comprises a first portion and a second portion;
extracting, from the first portion, a data utilization pattern for the cloud computing resource usage;
extracting, from the second portion, a present state of the cloud computing resource usage;
forecasting the first metric at a first point in time by generating a probability distribution vector representing probability distributions of future states of the cloud computing resource usage based on the data utilization pattern and the present state;
determining a formatting for a second short-form communication based on a formatting preference; and
generating for display, via the user interface, the second short-form communication, wherein the second short-form communication comprises the first response.

3. The method of claim 2, wherein determining the first portion of the first dataset that is available to the first user further comprises:
retrieving a user profile for the first user;
retrieving a security credential from the user profile; and
determining that the first portion is available to the first user based on the security credential.

4. The method of claim 2, wherein determining the first portion of the first dataset that is available to the first user further comprises:
retrieving a security credential for the first user;
inputting the security credential into a database, wherein the database comprises dataset portions available to inputted security credentials;
receiving an output from the database, wherein the output indicates that the first portion of the first dataset is available to the security credential; and
determining that the first portion is available to the first user based on the output.

5. The method of claim 2, wherein determining the first portion of the first dataset that is available to the first user further comprises:
retrieving a team for the first user;
inputting the team into a database, wherein the database comprises dataset portions available to inputted teams;
receiving an output from the database, wherein the output indicates that the first portion of the first dataset is available to the team; and
determining that the first portion is available to the first user based on the output.

6. The method of claim 2, wherein determining the first portion of the first dataset that is available to the first user further comprises:

retrieving a role for the first user;

inputting the role into a database, wherein the database comprises dataset portions available to inputted roles;

receiving an output from the database, wherein the output indicates that the first portion of the first dataset is available to the role; and determining that the first portion is available to the first user based on the output.

7. The method of claim 2, wherein determining the first portion of the first dataset that is available to the first user further comprises:

determining a first user characteristic of the first user;

transmitting a request for a second user characteristic of the first user;

receiving the second user characteristic of the first user; and determining that the first portion is available to the first user based on the second user characteristic.

8. The method of claim 2, wherein determining the first dataset for generating the first response to the first query further comprises:

retrieving a keyword from the first query;

inputting the keyword into a database, wherein the database comprises dataset locations used to generate requested metrics; and receiving an output from the database, wherein the output identifies the first dataset.

9. The method of claim 2, wherein determining the first dataset for generating the first response to the first query further comprises:

retrieving an application corresponding to the first query;

inputting the application into a database, wherein the database comprises dataset locations used to generate requested metrics corresponding to applications; and receiving an output from the database, wherein the output identifies the first dataset.

10. The method of claim 2, wherein determining the first dataset for generating the first response to the first query further comprises:

retrieving an application programming interface corresponding to the first query;

inputting the application programming interface into a database, wherein the database comprises dataset locations used to generate requested metrics corresponding to application programming interfaces; and receiving an output from the database, wherein the output identifies the first dataset.

11. The method of claim 2, wherein determining the first dataset for generating the first response to the first query further comprises:

retrieving a frequency corresponding to the first query;

inputting the frequency into a database, wherein the database comprises dataset locations used to generate requested metrics corresponding to the frequency; and receiving an output from the database, wherein the output identifies the first dataset.

12. The method of claim 2, wherein determining the first dataset for generating the first response to the first query further comprises:

prior to receiving the first short-form communication, determining a first request characteristic for the first short-form communication; and selecting the first dataset from a plurality of datasets based on the first request characteristic.

13. The method of claim 2, wherein generating for display the second short-form communication further comprises:

retrieving a user profile for the first user; and retrieving the formatting preference from the user profile.

14. A non-transitory, computer-readable medium comprising instructions recorded thereon that when executed by one or more processors cause operations comprising:

receiving, from a first user via a user interface, a first short-form communication comprising a first query for a first metric at a first time point on cloud computing resource usage, wherein the first metric is a quantitative or qualitative assessment of the cloud computing resource usage;

determining a first dataset for generating a first response to the first query, wherein the first dataset comprises a first portion and a second portion;

determining, from the first portion, a data utilization pattern for a plurality of physical hosts over a time period;

determining, from the second portion, network routes between the plurality of physical hosts;

forecasting a resource strain on a first network route of the network routes at the first time point by generating a probability distribution vector representing probability distributions of future states of the cloud computing resource usage based on the data utilization pattern and the network routes;

determining the first metric based on the resource strain; and generating for display, via the user interface, a second short-form communication, wherein the second short-form communication comprises the first response.

15. The non-transitory, computer-readable medium of claim 14, wherein determining the first portion of the first dataset that is available to the first user further comprises:

retrieving a user profile for the first user;

retrieving a security credential from the user profile; and determining that the first portion is available to the first user based on the security credential.

16. The non-transitory, computer-readable medium of claim 14, wherein determining the first portion of the first dataset that is available to the first user further comprises:

retrieving a security credential for the first user;

inputting the security credential into a database, wherein the database comprises dataset portions available to inputted security credentials;

receiving an output from the database, wherein the output indicates that the first portion of the first dataset is available to the security credential; and determining that the first portion is available to the first user based on the output.

17. The non-transitory, computer-readable medium of claim 14, wherein determining the first portion of the first dataset that is available to the first user further comprises:

retrieving a team for the first user;

inputting the team into a database, wherein the database comprises dataset portions available to inputted teams;

receiving an output from the database, wherein the output indicates that the first portion of the first dataset is available to the team; and determining that the first portion is available to the first user based on the output.

18. The non-transitory, computer-readable medium of claim 14, wherein determining the first portion of the first dataset that is available to the first user further comprises:

retrieving a role for the first user;

inputting the role into a database, wherein the database comprises dataset portions available to inputted roles;

receiving an output from the database, wherein the output indicates that the first portion of the first dataset is available to the role; and determining that the first portion is available to the first user based on the output.

19. The non-transitory, computer-readable medium of claim 14, wherein generating for display the second short-form communication further comprises:

retrieving a user profile for the first user;

retrieving a formatting preference from the user profile; and determining a formatting for the second short-form communication based on the formatting preference.

20. The non-transitory, computer-readable medium of claim 14, wherein determining the first portion of the first dataset that is available to the first user further comprises:

determining that the first portion of the first dataset is available to the first user;

determining that the first portion is not sufficient to determine the first metric;

determining that the second portion is sufficient to determine the first metric;

determining that the second portion is not available to the first user;

determining a user characteristic required to access the second portion; and populating the first response with a request to transmit the user characteristic.

\*  \*  \*  \*  \*